(12) United States Patent
Brahma et al.

(10) Patent No.: US 8,800,272 B2
(45) Date of Patent: Aug. 12, 2014

(54) SYSTEM AND METHOD FOR PROCESSING NH3 SLIPPAGE OF A SELECTIVE CATALYST REDUCTION SYSTEM

(75) Inventors: Avra Brahma, Canton, MI (US); Devesh Upadhyay, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 154 days.

(21) Appl. No.: 13/183,700

(22) Filed: Jul. 15, 2011

(65) Prior Publication Data
US 2012/0023907 A1 Feb. 2, 2012

(51) Int. Cl.
*F01N 3/00* (2006.01)
*F01N 3/20* (2006.01)
*F01N 13/04* (2010.01)

(52) U.S. Cl.
CPC ........... *F01N 3/208* (2013.01); *F01N 2560/021* (2013.01); *F01N 3/2093* (2013.01); *F01N 2610/02* (2013.01); *F01N 2240/36* (2013.01); *F01N 13/04* (2013.01); *F01N 2900/1616* (2013.01); *F01N 3/2053* (2013.01); *Y02T 10/24* (2013.01); *F01N 2560/026* (2013.01)
USPC ................... 60/295; 60/301; 60/286; 60/287; 60/288

(58) Field of Classification Search
USPC .................................... 60/287, 288, 295, 301
See application file for complete search history.

(56) References Cited

U.S. PATENT DOCUMENTS

| | | | |
|---|---|---|---|
| 6,192,675 B1 * | 2/2001 | Hirota et al. ..................... | 60/286 |
| 6,761,025 B1 * | 7/2004 | Gladden ......................... | 60/286 |
| 6,871,490 B2 | 3/2005 | Liang et al. | |
| 7,251,929 B2 | 8/2007 | Hu et al. | |
| 8,061,122 B2 * | 11/2011 | Chaineux et al. ............... | 60/286 |
| 2006/0213187 A1 * | 9/2006 | Kupe et al. ...................... | 60/286 |
| 2006/0260296 A1 * | 11/2006 | Theis .............................. | 60/286 |
| 2007/0294999 A1 * | 12/2007 | Yoshizaki et al. .............. | 60/274 |
| 2009/0199537 A1 | 8/2009 | Sisken et al. | |
| 2009/0266063 A1 * | 10/2009 | Gandhi et al. .................. | 60/301 |
| 2010/0180579 A1 * | 7/2010 | Huang et al. .................... | 60/297 |
| 2010/0199643 A1 * | 8/2010 | Yacoub ........................... | 60/286 |
| 2010/0229535 A1 * | 9/2010 | Theis .............................. | 60/274 |
| 2010/0313550 A1 * | 12/2010 | Kopp et al. ..................... | 60/286 |
| 2011/0000190 A1 | 1/2011 | Svensson et al. | |
| 2011/0041480 A1 * | 2/2011 | Yasui et al. ..................... | 60/286 |
| 2011/0056191 A1 * | 3/2011 | Ono et al. ....................... | 60/295 |
| 2011/0058999 A1 * | 3/2011 | Ettireddy et al. .......... | 423/213.5 |
| 2011/0185707 A1 | 8/2011 | Upadgyay et al. | |
| 2012/0204542 A1 * | 8/2012 | Norris et al. .................... | 60/274 |
| 2012/0210697 A1 * | 8/2012 | Garimella et al. .............. | 60/274 |

* cited by examiner

*Primary Examiner* — Thomas Denion
*Assistant Examiner* — Patrick Maines
(74) *Attorney, Agent, or Firm* — Julia Voutyras; Alleman Hall McCoy Russell & Tuttle LLP

(57) ABSTRACT

Systems and methods for storing $NH_3$ that has slipped through a first SCR are described. In one example, $NH_3$ is stored in a second SCR and released to the first SCR via desorption. The systems and method may reduce $NH_3$ consumption and increase $NH_3$ utilization within an exhaust system.

12 Claims, 5 Drawing Sheets

SYSTEM AND METHOD FOR PROCESSING NHD SLIPPAGE OF A SELECTIVE CATALYST REDUCTION SYSTEM

BACKGROUND/SUMMARY

Nitrogen oxides (e.g., NOx) may be processed in a vehicle exhaust system via a selective reduction catalyst (SCR). The SCR reduces the NOx into $N_2$ and $H_2O$. In some systems the SCR may co-operate with a reductant such as ammonia ($NH_3$) to reduce the NOx when there is sufficient temperature within the SCR. The ammonia may be injected to the SCR from a storage tank via an injector. However, if excess ammonia is delivered to the SCR via the injector, ammonia may pass through the SCR and enter the atmosphere. Models have been developed to estimate the amount of ammonia stored within a SCR so that ammonia injection may be stopped before ammonia slips past the SCR. Nevertheless, ammonia may slip past an SCR due to modeling and system input (e.g., feedgas NOx, injector errors, urea quality) errors. In addition, the $NH_3$ slip past the SCR is wasted urea.

The inventors herein have recognized the above-mentioned disadvantages and have developed a system for controlling and reusing the vehicle exhaust system $NH_3$ slippage, comprising: a first SCR positioned in a vehicle exhaust system downstream of an engine; a second SCR positioned in the vehicle exhaust system; and a controller including instructions to direct $NH_3$ slippage from the first SCR to the second SCR, the controller including additional instructions to direct exhaust gases from the second SCR to the first SCR.

By storing $NH_3$ slippage from a first SCR in a second SCR and directing exhaust gases from the second SCR to the first SCR, it may be possible to reduce $NH_3$ slippage from a vehicle exhaust system to atmosphere as well as recover the slipped NH3 for further NOx reduction in the SCR and lower urea cost. In particular, $NH_3$ that has slipped past the first SCR can be stored in the second SCR and then returned to the first SCR via desorption so that NOx may be additionally processed in the first SCR via the slipped $NH_3$. In this way, it may be possible to better utilize $NH_3$ that has been injected to the exhaust system to reduce NOx.

The present description may provide several advantages. Specifically, the approach may improve $NH_3$ utilization in a vehicle exhaust system. Further, the approach may reduce an amount of $NH_3$ emissions from a vehicle. Further still, the approach may also reduce the amount of $NH_3$ used within the vehicle exhaust system since SCR $NH_3$ can be recycled back to a primary SCR 70.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
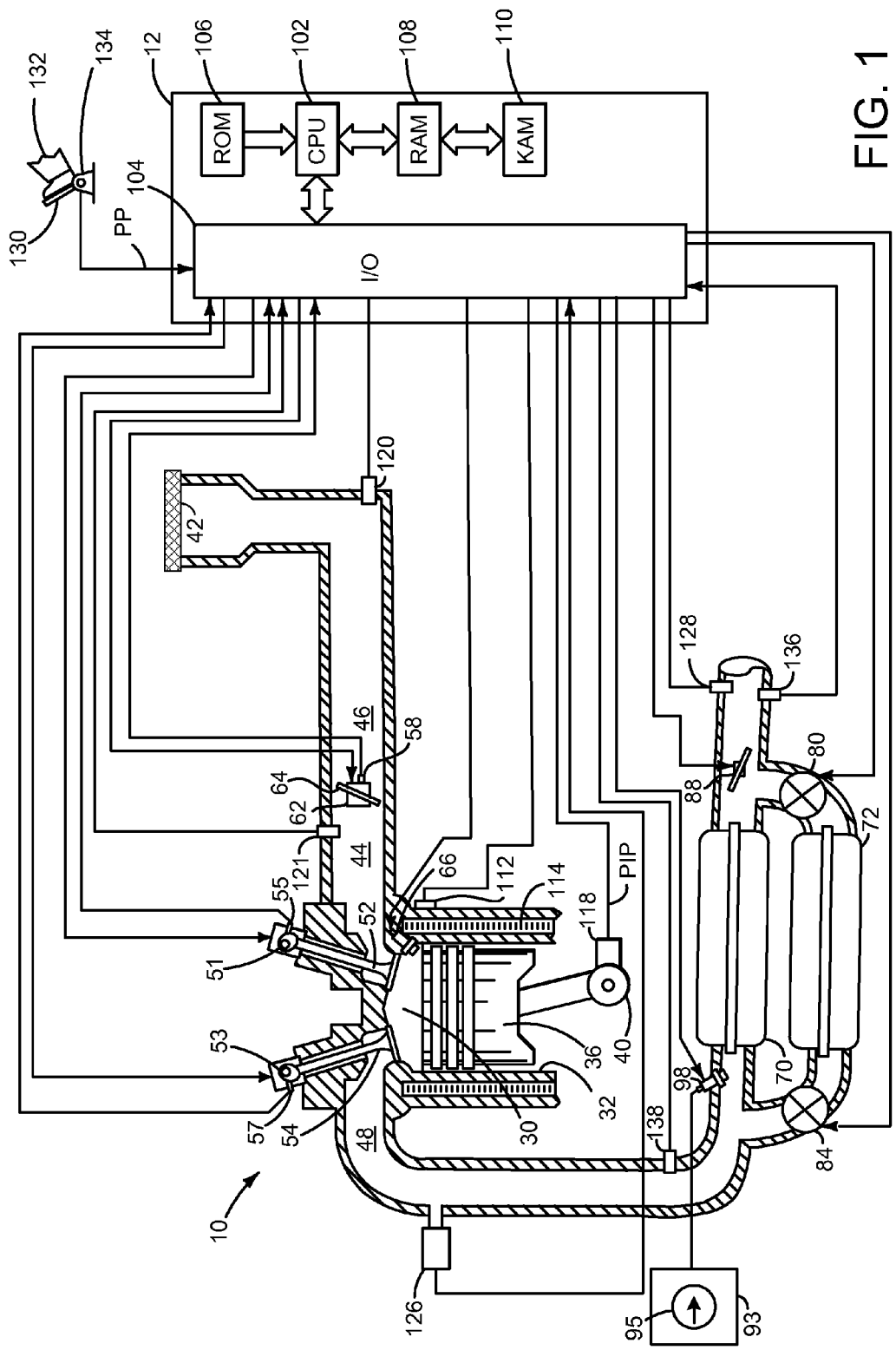
FIG. 1 shows a schematic depiction of an engine and exhaust system.
Figure 2:
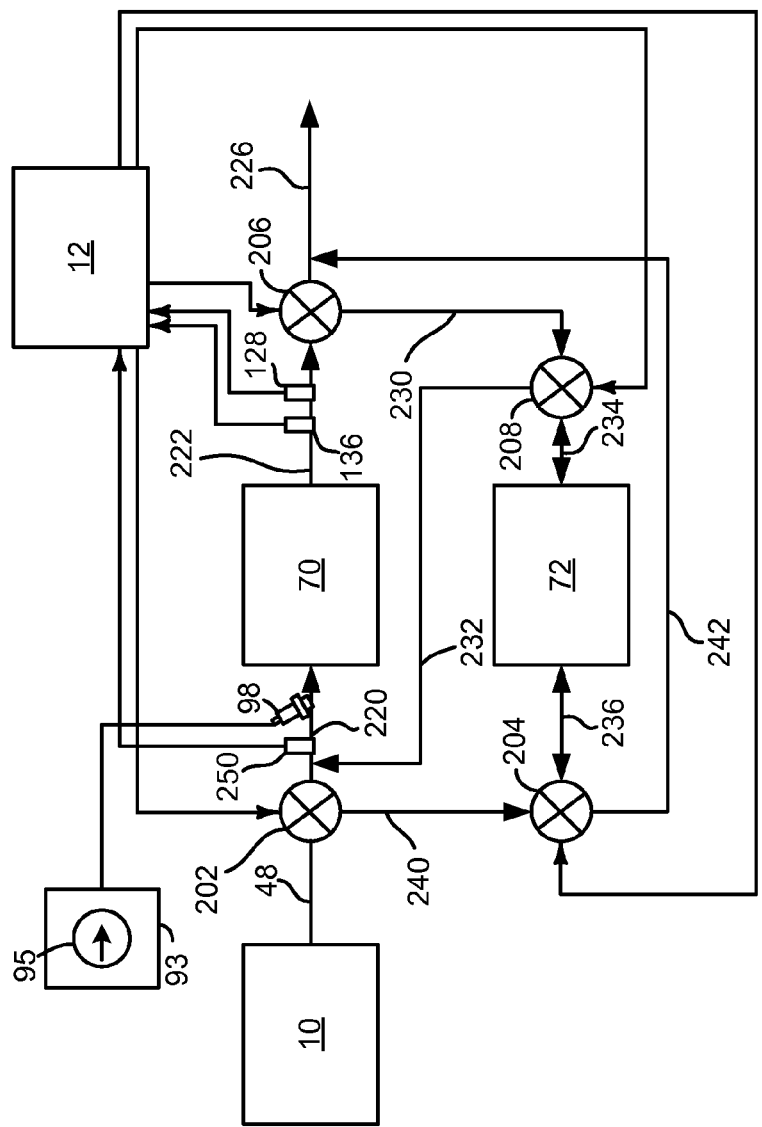
FIG. 2 shows an example engine and second exhaust system.
Figure 3:
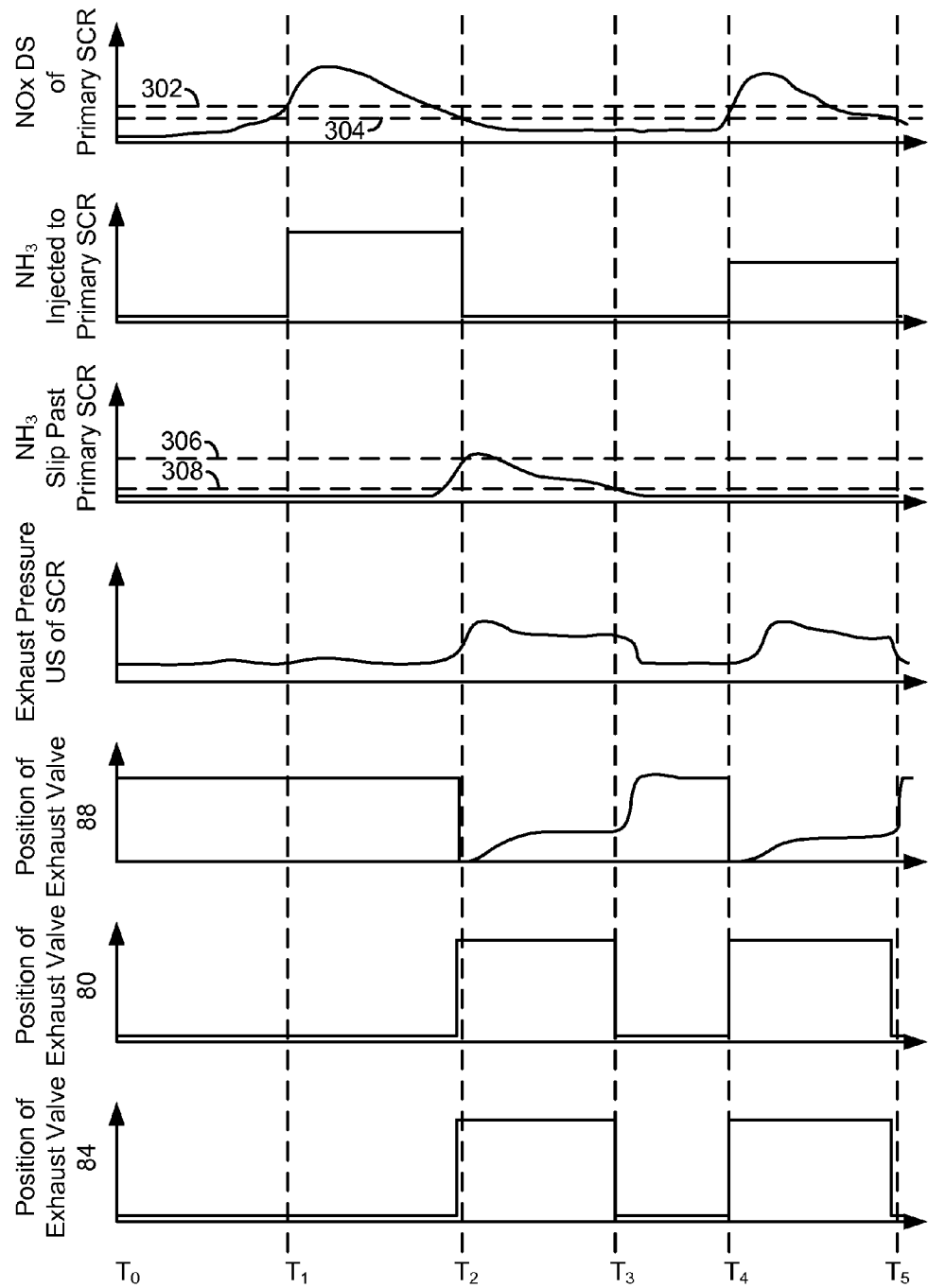
FIGS. 3-4 show prophetic performance data for the exhaust systems illustrated in FIGS. 1 and 2.
Figure 4:
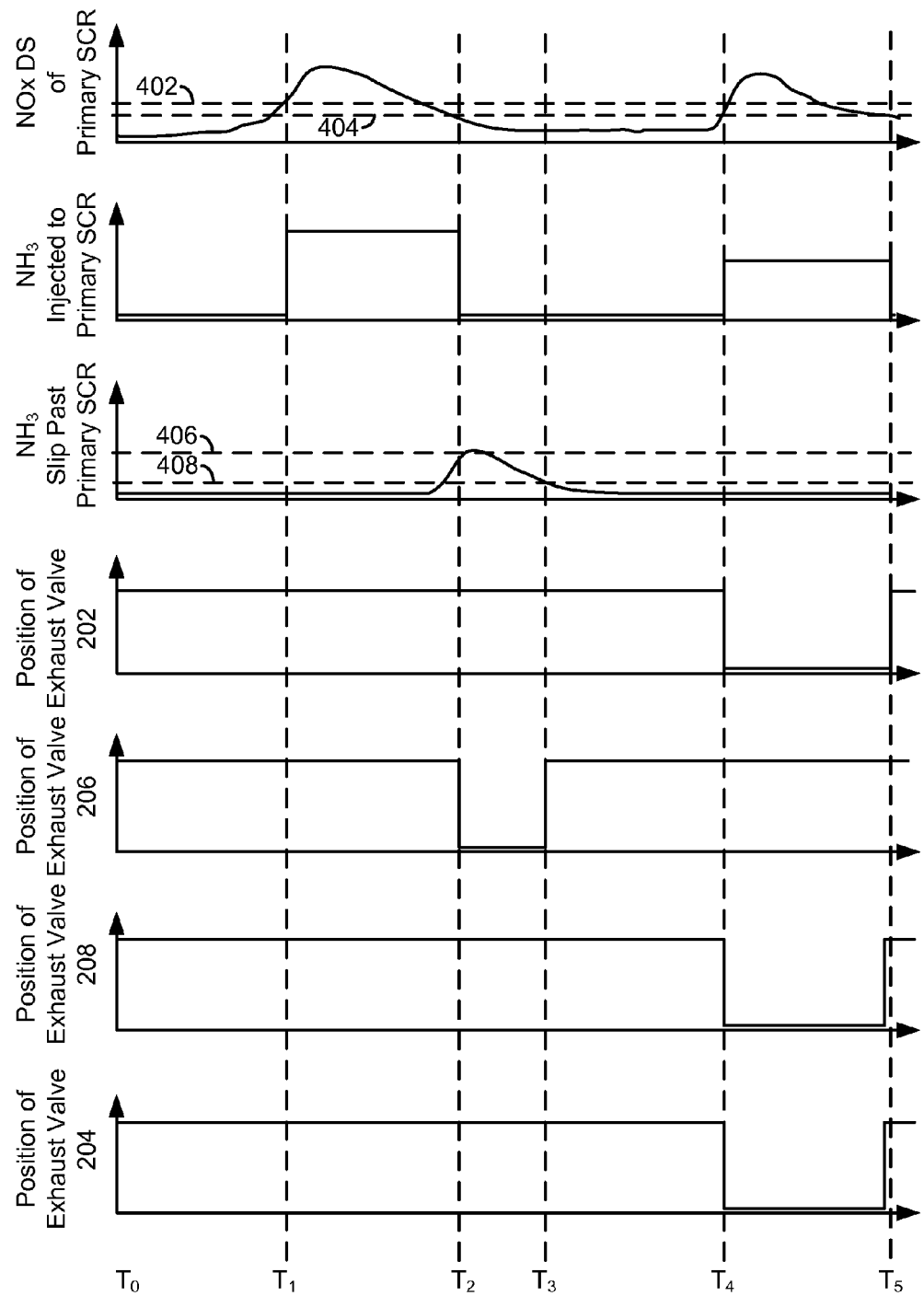
Figure 5:
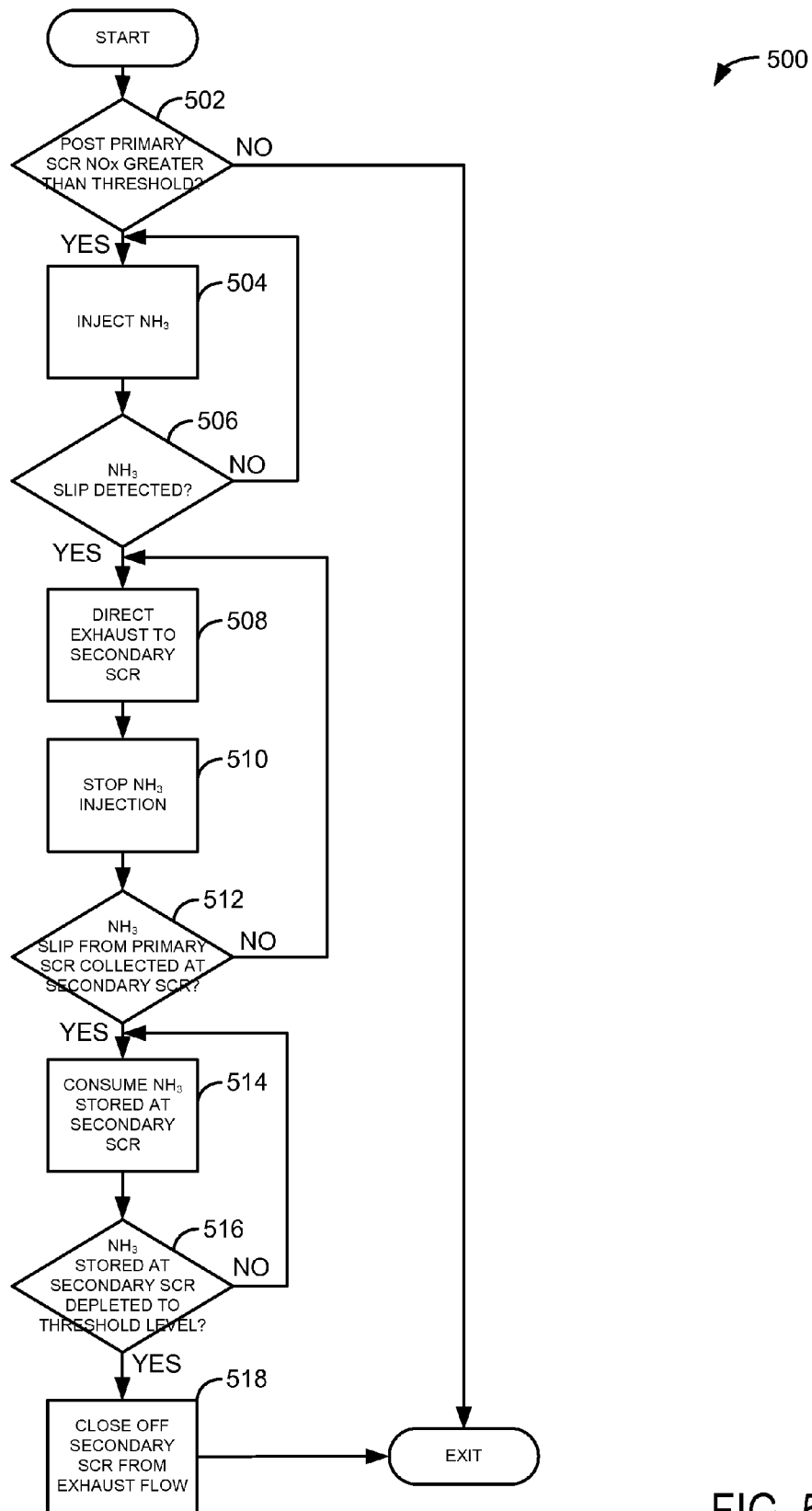
FIG. 5 shows a flowchart of an example method for processing $NH_3$ stored within an exhaust system.

The present description is related to storing and using $NH_3$ within a vehicle exhaust system. FIG. 1 shows one example of an exhaust system with two SCRs for processing NOx and storing $NH_3$. FIG. 2 shows an alternative example for processing NOx, injecting $NH_3$, and storing $NH_3$ within an exhaust system. FIGS. 3 and 4 show example prophetic signals for an exhaust system capable of storing $NH_3$ and processing NOx. FIG. 5 shows and example flowchart for processing NOx and storing $NH_3$ that has slipped through a SCR.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of a signal from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control.

Intake manifold 44 is shown communicating with optional electronic throttle 62 which adjusts a position of throttle plate 64 to control air flow from engine air intake 46. Air enters engine air intake 46 via air filter 42.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70 in the vicinity of NOx sensor 126. In other examples, NOx sensor 126 may be omitted and an oxygen sensor provided in its place. In still other examples, a second UEGO sensor may be located downstream of one or more exhaust after treatment devices. In the present example, a second NOx sensor 128 is provided downstream of an emissions control device.

Emissions device 70 is shown positioned in the engine exhaust system downstream of exhaust manifold 48. Emissions device 70 may be a SCR. Alternatively, emissions device 70 may be a particulate filter and oxidation catalyst bricks. Emissions device 72 is shown located in parallel with emissions device 70. In one example, emission device 72 is a SCR. NOx sensor 128 is shown positioned upstream of emissions devices 70 and 72. Exhaust valve 88 is shown positioned downstream of emissions devices 70 and 72. In one example, exhaust valve 88 may be a butter fly type valve having a position that can be adjusted in increments between a fully open position and a fully closed position. Exhaust valve 80 is shown positioned downstream of emissions device 72 and in an exhaust passage that flows into an exhaust passage in which emission control device 70 is positioned. Exhaust valve 84 is shown positioned upstream of emissions control device 72 and not upstream of emission control device 70.

In one example, a position of exhaust valve 88 is adjusted in response to a pressure in the exhaust system upstream of emissions control device measured via pressure sensor 138. In particular, between pressure pulses from cylinder 30, exhaust valve 88 is partially closed and then reopened to direct some exhaust gases exiting emission control device 70 to emissions control device 72 when exhaust valves 80 and 84 are in open positions. A portion of exhaust gases exiting emission control device 70 may flow into emission control device 72 when exhaust pressure is raised at exhaust valve 88 and reduced upstream of emission control device 70 as pressure varies in exhaust manifold 48 due to valve overlap and engine exhaust gas pressure. Thus, the position of exhaust valve 88 is adjusted responsive to exhaust pressure in exhaust manifold 48 to induce flow from the outlet of emission control device to emission control device 72.

$NH_3$ may be injected to the exhaust system at a location upstream of emission control device 70 that is not upstream of emission control device 72. $NH_3$ may be injected via injector 98. $NH_3$ is supplied to injector 98 via pump 95 from tank 93. Injector 98 is supplied a signal from controller 12 to control $NH_3$ flow to emission control device 70. $NH_3$ may be sensed at $NH_3$ sensor 136 while NOx may be sensed downstream of SCR 70 via NOx sensor 128.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; exhaust pressure from exhaust pressure sensor 138; a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, an alternative exhaust system 200 for processing NOx and storing $NH_3$ is shown. Engine 10 exhausts combusted air-fuel mixtures via exhaust pipe or conduit 48. Engine exhaust may be routed to emissions control device 70 or emissions control device 72 from exhaust pipe 48 via three-way valve 202. Controller 12 adjusts the position of three-way valve 202 based on inputs to controller 12. In one example, three-way valve 202 directs exhaust gas from exhaust pipe 48 to emission control device 72 via exhaust pipe 220 when in a default state. A concentration of NOx in exhaust gases may be sensed via NOx sensor 250. $NH_3$ may be injected to exhaust pipe 220 upstream of emission control device 70 via $NH_3$ injector 98 from pump 95 and tank 93. Three-way valve 202 directs exhaust gas from exhaust pipe 48 to exhaust pipe 240 when not positioned in the default state.

Exhaust gases passing through emission control device 70 exit to exhaust pipe 222. NOx concentration in exhaust gases may be sensed via NOx sensor 128. $NH_3$ in exhaust gas due to $NH_3$ slipping past emission device 70 may be sensed via $NH_3$ sensor 136, if such a sensor is used. Otherwise, an internal slip detection algorithm may be used to indicate slip of $NH_3$. Exhaust gases flowing through exhaust pipe 222 is directed to exhaust pipe 226 or exhaust pipe 230 depending on a position of three-way valve 206. In a default position, three-way valve 206 directs exhaust to exhaust pipe 226. When not in the default position, three-way valve 206 directs exhaust gases from exhaust pipe 222 to exhaust pipe 230. Controller 12 supplies a signal to change the position of three-way valve 206. Exhaust gases flow from exhaust pipe 226 to atmosphere.

Exhaust gases passing through exhaust pipe 230 may pass to exhaust pipe 232 or exhaust pipe 234 via three-way valve 208. In a default position, three-way valve 208 allows exhaust to flow from exhaust pipe 230 to exhaust pipe 234 or vice-versa. When not in the default position, three-way valve 208 allows exhaust to flow from exhaust pipe 230 to exhaust pipe 232 or vice-versa.

Emission control device 72 can receive exhaust gases via exhaust pipe 234 or 236 depending on the positions of three-way valves 202, 206, 208, and 204. In a default position, three-way valve 204 allows exhaust gases to flow from exhaust pipe 236 to exhaust pipe 242 or vice-versa. When not in the default position, three-way valve 204 allows exhaust to flow from exhaust pipe 240 to exhaust pipe 236 or vice-versa.

During a first operating mode, exhaust valves 202 and 206 are operated in default positions so that exhaust passes from engine 10 to emission control device 70 and to atmosphere. $NH_3$ may be injected to emission control device 70 when a NOx concentration greater than a threshold level is detected via NOx sensor 128. If $NH_3$ slip greater than a threshold level is detected via $NH_3$ sensor 136 or algorithm, exhaust valve 206 changes state to allow exhaust to flow from exhaust pipe 222 to exhaust pipe 230 and the exhaust system enters a second operating mode.

During a second operating mode, exhaust valve 202 allows exhaust to flow from exhaust pipe 48 to exhaust pipe 220. Exhaust also flows from exhaust pipe 222 to exhaust pipe 230 via changing the state of exhaust valve 206. Exhaust valve 208 is in the default position where exhaust flows from exhaust pipe 230 to exhaust pipe 234. Further, exhaust valve 204 is positioned in a default state to allow exhaust gas to flow from exhaust pipe 236 to exhaust pipe 242. Thus, exhaust passes from engine 10 to emission control device 70 and then to emissions control device 72 before exiting to atmosphere. In this way, $NH_3$ that may slip pass emission control device 70 may be stored within emission control device 72. Exhaust system 200 exits the second mode when $NH_3$ slippage past emission control device 70 is less than a threshold level. Exhaust system 200 may enter a third mode where $NH_3$ stored in the emission control device 72 is desorbed to emission control device 70.

During a third operating mode, exhaust valve 202 allows exhaust to flow from exhaust pipe 48 to exhaust pipe 240. Exhaust also flows from exhaust pipe 240 to exhaust pipe 236 via changing the state of exhaust valve 204. Exhaust valve 204 is not in the default position where exhaust flows from exhaust pipe 240 to exhaust pipe 236. Further, exhaust valve 208 is not positioned in a default state to allow exhaust gas to flow from exhaust pipe 234 to exhaust pipe 232. Exhaust and $NH_3$ then enters exhaust pipe 220 and emission control device 70. Exhaust exits emission control device 70 and flows to exhaust pipes 222 and 226 via exhaust valve 206 which is in a default position. Thus, exhaust passes from engine 10 to emission control device 72 and then to emissions control device 70 before exiting to atmosphere. In this way, $NH_3$ stored in emission control device 72 as a result of slip from emission control device 70 may be transferred back to emission control device 70 to reduce NOx.

Thus, the systems of FIGS. 1 and 2 provide for controlling vehicle exhaust system $NH_3$ slippage, comprising: a first SCR positioned in a vehicle exhaust system downstream of an engine; a second SCR positioned in the vehicle exhaust system; and a controller including instructions to direct $NH_3$ slippage from the first SCR to the second SCR, the controller including additional instructions to direct exhaust gases from the second SCR to the first SCR. By storing $NH_3$ slippage in one SCR and then utilizing the stored $NH_3$ in a second SCR, it may be possible to reduce $NH_3$ slippage and $NH_3$ utilization. The system further comprises a first valve and a second valve, and where the controller adjusts a state of the first valve to direct $NH_3$ slippage from the first SCR to the second SCR. In one example, the system includes where the controller includes further instructions to adjust a state of the second valve to direct exhaust gases from the second SCR to the first SCR.

In addition, the system includes where the controller includes further instructions for flowing exhaust through the second SCR in two directions. Thus, the $NH_3$ can be stored and desorbed from an SCR via switching exhaust flow direction. The system includes where the controller includes further instructions for flowing exhaust through the first SCR in only a single direction. The system further comprises a butter fly valve positioned downstream of the first SCR in a direction of exhaust flow. The butter fly valve allows exhaust flow to be directed to the secondary SCR 72. The system also includes where the controller includes further instructions for directing exhaust gases from the second SCR to the first SCR after a temperature of the first SCR exceeds a threshold temperature.

In another example, the systems of FIGS. 1 and 2 provide for a $NH_3$ slippage control system, comprising: a first SCR positioned in an exhaust system downstream of an engine; a second SCR positioned in the exhaust system in parallel with the first SCR; and a controller including instructions to direct first SCR $NH_3$ slippage to the second SCR, and instructions to reduce an amount of $NH_3$ stored within the second SCR after first SCR $NH_3$ slippage is less than a threshold level. The $NH_3$ slippage control system further comprises a first valve that directs SCR $NH_3$ slippage from the first SCR to the second SCR, where the first valve is positioned in a first exhaust path, and where the first valve is positioned downstream of the first SCR in a direction of exhaust flow from the first SCR. The $NH_3$ slippage control system further comprises a second valve that directs exhaust from the second SCR to the first SCR, where the second valve is positioned in a second exhaust path, the second exhaust path in parallel with the first exhaust path. In another example, the $NH_3$ slippage control system further comprises a $NH_3$ injector positioned upstream of the first SCR in the exhaust system and downstream of an engine. The $NH_3$ slippage control system further comprises additional controller instructions for adjusting flow through the second SCR in response to a pressure in the exhaust system. In this way, exhaust flow through the secondary SCR 72 may be adjusted. The $NH_3$ slippage control system further comprises additional controller instructions for adjusting states of four exhaust valves to reverse flow through the second SCR. The $NH_3$ slippage control system further comprises additional controller instructions for maintaining flow in a single direction through the first SCR.

Referring now to FIG. 3, an example of a prophetic sequence operating the exhaust system of FIG. 1 is shown. The sequence of FIG. 3 may be provided via controller 12 of FIG. 1 via executing instructions according to the method of FIG. 5.

The first plot from the top of the figure shows the concentration of NOx downstream of a primary SCR (e.g., emission control device 70 of FIG. 1). The concentration of NOx in the exhaust system increases in the direction of the arrow of the Y axis. The X axis represents time and time increases from the left to the right side of the figure.

The second plot from the top of the figure shows an amount of $NH_3$ injected to the primary SCR (e.g., emission control device 70 of FIG. 1). The flow rate of $NH_3$ increases in a direction of the arrow of the Y axis. The X axis represents time and time increases from the left to the right side of the figure. Thus, the amount of $NH_3$ injected to the primary SCR 70 can be increased by increasing the flow rate of $NH_3$ and the amount of time the $NH_3$ is injected to the primary SCR 70.

The third plot from the top of the figure shows an amount of $NH_3$ slip past the primary SCR (e.g., emission control device 70 of FIG. 1). The $NH_3$ slip rate concentration increases in a direction of the arrow of the Y axis. The X axis represents time and time increases from the left to the right side of the figure.

Thus, the amount of $NH_3$ slipping past the primary SCR 70 increases as the slip time increases and as the slip concentration increases.

The fourth plot from the top of the figure shows exhaust pressure upstream of the primary SCR (e.g., emission control device 70 of FIG. 1). The exhaust pressure increases in a direction of the arrow of the Y axis. The X axis represents time and time increases from the left to the right side of the figure.

The fifth plot from the top of the figure shows a position of exhaust valve 88. Exhaust valve 88 is in an open state when the exhaust position is at a higher level. Exhaust valve 88 is in a closed state when the exhaust position is at a lower level near the X axis. The X axis represents time and time increases from the left to the right side of the figure.

The sixth plot from the top of the figure shows a position of exhaust valve 80 in the exhaust system of FIG. 1. Exhaust valve 80 is in a closed state when the exhaust valve signal is at a lower level. Exhaust valve 80 is in an open state when the exhaust valve signal is at a higher level. The X axis represents time and time increases from the left to the right side of the figure.

The seventh plot from the top of the figure shows a position of exhaust valve 84 in the exhaust system of FIG. 1. Exhaust valve 84 is in a closed state when the exhaust valve signal is at a lower level. Exhaust valve 84 is in an open state when the exhaust valve signal is at a higher level. The X axis represents time and time increases from the left to the right side of the figure.

At time $T_0$, a low level of NOx is passing through a primary SCR (e.g., emission control device 70). Further, $NH_3$ is not being injected to the primary SCR 70 to reduce NOx in the engine exhaust. There is also very little $NH_3$ flow past the primary SCR 70 and the exhaust pressure upstream of the primary SCR 70 is relatively low. The exhaust valve 88 is in or near a fully open position and exhaust valves 80 and 84 are closed. Thus, engine exhaust is flowing through the primary SCR 70 where NOx is being reduced to $N_2$ and $H_2O$.

At time $T_1$, NOx passes through a primary SCR 70 at a level that is greater than threshold level 302. Consequently, $NH_3$ injection begins and $NH_3$ is supplied to primary SCR 70 to reduce NOx in the engine exhaust. The flow rate of $NH_3$ is at a higher rate so that NOx reduction may be initiated. There is also very little $NH_3$ flow past the primary SCR 70 since the $NH_3$ is adsorpted by the primary SCR 70 and acts to reduce the NOx flowing into the SCR. The exhaust valve 88 remains in a fully open position and exhaust valves 80 and 84 are closed. Thus, $NH_3$ is injected to the primary SCR 70 but not to secondary SCR (e.g., emission control device 72).

At time $T_2$, NOx passing through a primary SCR 70 is reduced to a level that is less than threshold level 304. Consequently, $NH_3$ injection stops. In addition, a slip rate of $NH_3$ past the primary SCR 70 greater than a threshold level 306 occurs. Therefore, a position of exhaust valve 88 in the system of FIG. 1 is closed to direct some exhaust flow to secondary SCR (e.g., emission control device 72 of FIG. 1). By at least partially closing exhaust valve 88 a portion of $NH_3$ may be directed from the primary SCR 70 to the secondary SCR 72 in the system of FIG. 1. Closing exhaust valve 88 causes exhaust pressure to rise upstream of the primary SCR 70. Exhaust valve 88 begins to open as the exhaust pressure upstream of the primary SCR 70 increases. Thus, a position of exhaust valve 88 is adjusted based on the exhaust pressure upstream of primary SCR 70. In some examples, the position of exhaust valve 88 is adjusted in response to peaks and valleys of the exhaust pressure upstream of the primary SCR 70. For example, during pressure peaks exhaust valve 88 opens further. On the other hand, during pressure valleys exhaust valve 88 closes further. In this way, a portion of exhaust and $NH_3$ may be directed from primary SCR 70 to secondary SCR 72 to store $NH_3$. Exhaust valves 80 and 84 are opened to allow exhaust to flow into secondary SCR 72.

At time $T_3$, $NH_3$ slipping past the primary SCR 70 is reduced to a level that is less than threshold level 308. Therefore, exhaust valve 88 is opened and exhaust valves 80 and 84 are closed. Thus, storage of $NH_3$ from the primary SCR 70 to the secondary SCR 72 is ceased. Further, the concentration of NOx in the engine exhaust is shown at a low level as the primary SCR 70 continues to hold and use $NH_3$ that was previously injected to reduce NOx. The engine exhaust pressure decreases as exhaust valve 88 is opened farther.

At time $T_4$, NOx again passes through a primary SCR 70 at a level that is greater than threshold level 302 as $NH_3$ in the primary SCR 70 is depleted. However, since $NH_3$ has been stored in the secondary SCR 72, a portion of the $NH_3$ stored in the secondary SCR 72 can be directed to the primary SCR 70 to reduce NOx. Therefore, exhaust valve 88 is closed and exhaust valves 80 and 84 are opened. Further, $NH_3$ is injected to the primary SCR 70 at a lower delivery rate than the when $NH_3$ was injected during the last $NH_3$ injection cycle since a portion of $NH_3$ delivered to the primary SCR 70 is provided by flowing exhaust gases thought the secondary SCR 72 to the primary SCR 70.

At time $T_5$, NOx passing through a primary SCR 70 is reduced to a level that is less than threshold level 304. Therefore, exhaust flow from the secondary SCR 72 to the primary SCR 70 and $NH_3$ injection is stopped. In particular, exhaust valves 80 and 84 are closed while exhaust valve 88 is opened further. In this way, exhaust valves 80, 84, and 88 can be adjusted in response to an amount of NOx and $NH_3$ in the exhaust system downstream of the primary SCR 70.

Referring now to FIG. 4, an example of a prophetic sequence operating the exhaust system of FIG. 2 is shown. The sequence of FIG. 4 may be provided via controller 12 of FIG. 2 via executing instructions according to the method of FIG. 5.

The first plot from the top of the figure shows the concentration of NOx downstream of a primary SCR (e.g., emission control device 70 of FIG. 2). The concentration of NOx in the exhaust system increases in the direction of the arrow of the Y axis. The X axis represents time and time increases from the left to the right side of the figure.

The second plot from the top of the figure shows an amount of $NH_3$ injected to the primary SCR (e.g., emission control device 70 of FIG. 2). The flow rate of $NH_3$ increases in a direction of the arrow of the Y axis. The X axis represents time and time increases from the left to the right side of the figure.

The third plot from the top of the figure shows an amount of $NH_3$ slip past the primary SCR (e.g., emission control device 70 of FIG. 2). The $NH_3$ slip rate concentration increases in a direction of the arrow of the Y axis. The X axis represents time and time increases from the left to the right side of the figure.

The fourth plot from the top of the figure shows a position of exhaust valve 202 during the sequence. Exhaust valve 202 allows engine exhaust to flow from exhaust pipe 48 to exhaust pipe 220 or vice-versa when the signal is at a higher level. Exhaust valve 202 allows engine exhaust to flow from exhaust pipe 48 to exhaust pipe 240 or vice-versa when the signal is at a lower level. The X axis represents time and time increases from the left to the right side of the figure.

The fifth plot from the top of the figure shows a position of exhaust valve 206 during the sequence. Exhaust valve 206 allows engine exhaust to flow from exhaust pipe 222 to exhaust pipe 226 or vice-versa when the signal is at a higher level. Exhaust valve 206 allows engine exhaust to flow from exhaust pipe 222 to exhaust pipe 230 or vice-versa when the signal is at a lower level. The X axis represents time and time increases from the left to the right side of the figure.

The sixth plot from the top of the figure shows a position of exhaust valve 208 during the sequence. Exhaust valve 208 allows engine exhaust to flow from exhaust pipe 230 to exhaust pipe 234 or vice-versa when the signal is at a higher level. Exhaust valve 208 allows engine exhaust to flow from exhaust pipe 230 to exhaust pipe 232 or vice-versa when the signal is at a lower level. The X axis represents time and time increases from the left to the right side of the figure.

The seventh plot from the top of the figure shows a position of exhaust valve 204 during the sequence. Exhaust valve 204 allows engine exhaust to flow from exhaust pipe 236 to exhaust pipe 242 or vice-versa when the signal is at a higher level. Exhaust valve 204 allows engine exhaust to flow from exhaust pipe 236 to exhaust pipe 240 or vice-versa when the signal is at a lower level. The X axis represents time and time increases from the left to the right side of the figure.

At time $T_0$, a low level of NOx is passing through a primary SCR (e.g., emission control device 70). Further, $NH_3$ is not being injected to the primary SCR 70 to reduce NOx in the engine exhaust. The level of $NH_3$ slip past the primary SCR 70 as well as the exhaust pressure upstream of the primary SCR 70 is relatively low. The exhaust valves 202, 206, 208, and 204 are in default positions. Thus, engine exhaust is allowed to flow through the primary SCR 70 so that NOx can be reduced to $N_2$ and $H_2O$.

At time $T_1$, NOx passes through a primary SCR 70 at a level that is greater than threshold level 402. Consequently, $NH_3$ injection begins and $NH_3$ is supplied to primary SCR 70 to reduce NOx in the engine exhaust. The flow rate of $NH_3$ is at a higher rate so that NOx reduction may be initiated. There is also very little $NH_3$ flow past the primary SCR 70 since the $NH_3$ is adsorbed by the primary SCR 70 and acts to reduce the NOx flowing into the SCR. The exhaust valves 202, 206, 208, and 204 remain in default states while $NH_3$ is injected to the exhaust system.

At time $T_2$, NOx passing through a primary SCR 70 is reduced to a level that is less than threshold level 404. Therefore, $NH_3$ injection is stopped. In addition, a slip rate of $NH_3$ past the primary SCR 70 greater than a threshold level 406 occurs. As a result, a position of exhaust valve 206 in the system of FIG. 2 changes state to direct all exhaust flow to secondary SCR (e.g., emission control device 72 of FIG. 2) from primary SCR 70. Thus, a position of exhaust valve 206 is adjusted based on NH3 slip through the primary SCR 70. In this way, substantially all exhaust from engine 10 and substantially all $NH_3$ slippage from SCR 70 may be directed to secondary SCR 72 so that $NH_3$ slipping past primary SCR 70 is stored in secondary SCR 72 Exhaust valves 202, 208, and 204 remain positioned in default states. Thus, exhaust system 200 can be transitioned to a $NH_3$ storage mode.

At time $T_3$, $NH_3$ slipping past the primary SCR 70 is reduced to a level that is less than threshold level 408. Therefore, exhaust valve 206 is transitioned back to a default state where exhaust passing through primary SCR 70 is directed to exhaust pipe 226 and then to atmosphere. Thus, storage of $NH_3$ from the primary SCR 70 to the secondary SCR 72 is ceased in response to $NH_3$ slip that is less than a threshold level. Further, the concentration of NOx in the engine exhaust is shown at a low level as the primary SCR 70 continues to hold and use $NH_3$ that was previously injected to reduce NOx. Exhaust valves 202, 208, and 204 remain in default positions.

At time $T_4$, NOx again passes through the primary SCR 70 at a level that is greater than threshold level 402 as $NH_3$ in the primary SCR 70 is depleted. However, since $NH_3$ has been stored in the secondary SCR 72, a portion of the $NH_3$ stored in the secondary SCR 72 can be directed to the primary SCR to reduce NOx. Therefore, the operating state of exhaust valves 202, 208, and 204 is changed to utilize the $NH_3$ stored within the secondary SCR 72. Engine exhaust flows from exhaust pipe 48 to exhaust pipe 240 when exhaust valve 202 changes operating state via a command from controller 12. Engine exhaust flows from exhaust pipe 240 to exhaust pipe 236 and through secondary SCR 72 to exhaust pipe 234. $NH_3$ within primary SCR 70 may be increased as $NH_3$ is released via desorption from secondary SCR 72. Exhaust valve 208 directs exhaust gas from exhaust pipe 234 to exhaust pipe 232. Exhaust flows from exhaust pipe 232 to exhaust pipe 220 and into primary SCR 70. Exhaust exits primary SCR 70 and flows through exhaust valve 206 before entering exhaust pipe 226. Exhaust leaves exhaust pipe 226 to atmosphere.

It should also be noted that engine exhaust may pass through exhaust valve 202 to exhaust valve 204 before entering secondary SCR 72. Exhaust may exit secondary SCR 72 passing through exhaust valve 208 before passing through exhaust valve 206 and entering exhaust pipe 226. Thus, $NH_3$ stored within secondary SCR 72 may be depleted via engine exhaust gas without the engine exhaust gas passing through SCR 70, if desired.

Injection of $NH_3$ is also reactivated at time $T_4$ albeit at a lower flow rate than at time $T_1$. The flow rate of $NH_3$ injection to the primary SCR 70 may be reduced because some $NH_3$ stored in secondary SCR 72 reduces NOx in the exhaust gas and since some of the $NH_3$ stored in the secondary SCR 72 may be captured and used in the primary SCR 70 to reduce NOx in the gases flowing through the primary SCR 70.

At time $T_5$, NOx in downstream of the primary SCR 70 is reduced to a level less than threshold level 404. Therefore, the operating states of exhaust valves 202, 208, and 204 are returned to default operating states. Further, $NH_3$ injection is ceased so that there is less possibility of $NH_3$ slipping past primary SCR 70. In this way, the $NH_3$ stored within the secondary SCR 72 can be utilized at a later time by primary SCR 70.

Referring now to FIG. 5, a flow chart of a method for processing $NH_3$ stored within an exhaust system is shown. The method of FIG. 5 is executable via a controller such as controller 12 of FIG. 1 to provide the operating sequences shown in FIGS. 3 and 4.

At 502, method 500 judges whether or not exhaust gases flowing through a primary SCR (e.g., emissions device 70 of FIG. 1) include a NOx concentration that is higher than a threshold amount. In one example, the NOx concentration may be sensed via a NOx sensor. If so, method 500 proceeds to 504. Otherwise, method 500 exits.

Note that in one example, engine exhaust gas is directed only through a primary SCR without being directed to a secondary SCR 72 so that the secondary SCR 72 has capacity to store $NH_3$ in anticipation of $NH_3$ slippage past the primary SCR 70.

At 504, method 500 begins to inject $NH_3$ to the exhaust system at a location upstream of the primary SCR 70 and in a path where the injected $NH_3$ will not reach the secondary SCR (e.g., emissions device 72 of FIG. 1) unless the $NH_3$ passes through the primary SCR 70. In one example, the flow rate of $NH_3$ injected may be based on the concentration of NOx downstream of the primary SCR 70. In another example, the flow rate of $NH_3$ injected to the primary SCR 70 may be related to engine operating conditions such as engine speed and load. $NH_3$ may be injected via activating an $NH_3$ pump and opening a $NH_3$ injector. Method 500 proceeds to 506 after $NH_3$ injection is activated.

At 506, method 500 judges whether or not $NH_3$ slip greater than a threshold level past the primary SCR 70 is detected. In one example, $NH_3$ slip may be detected via a $NH_3$ sensor positioned downstream of the primary SCR 70. If $NH_3$ slip is not detected, $NH_3$ injection continues and method 500 returns to 504. If $NH_3$ slip is detected, method 500 proceeds to 508. In other examples, method 500 may proceed to 508 without $NH_3$ being detected. For example, a model can estimate the amount of $NH_3$ stored within the primary SCR 70. If the estimated amount of $NH_3$ stored in the primary SCR 70 exceeds a threshold level without $NH_3$ slip past the primary SCR 70 being detected, injection of $NH_3$ can be stopped and method 500 proceeds to exit.

At 508, exhaust from the primary SCR (e.g., emissions devices 70 of FIGS. 1 and 2) is directed to the secondary SCR (e.g., emissions devices 72 of FIGS. 1 and 2) to store $NH_3$ that has slipped past the primary SCR 70. In one example, exhaust may be directed from the primary SCR 70 to the secondary SCR 72 via adjusting a position of a valve located downstream of the primary SCR 70 in response to exhaust pressure upstream of the primary SCR 70. FIG. 1 and FIG. 3 provide an example system and sequence for adjusting a downstream exhaust valve in response to exhaust pressure and $NH_3$ slippage past a primary SCR 70. In another example as shown in the system of FIG. 2 and the sequence of FIG. 4, substantially all exhaust gas exiting a primary SCR 70 may be directed to a secondary SCR 72 in response to $NH_3$ slippage past the primary SCR 70. In particular, the state of exhaust valve 206 of FIG. 2 is changed such that exhaust gases flow to SCR 72 instead of flowing to atmosphere after exiting primary SCR 70. In this way, $NH_3$ that slips past primary SCR 70 can be stored within secondary SCR 72. Method 500 proceeds to 510 after at least a portion of engine exhaust is directed to the secondary SCR 72.

At 510, method 500 stops $NH_3$ injection to the primary SCR 70. In one example, injection of $NH_3$ may be stopped via closing an injector and deactivating a $NH_3$ pump. Method 500 proceeds to 512 after $NH_3$ injection is stopped.

At 512, method 500 judges whether or not substantially all $NH_3$ slip past the primary SCR 70 has been directed to the secondary SCR 72 for storage. In one example, it may be judged that substantially all $NH_3$ slip past the primary SCR 70 has been directed to the secondary SCR 72 when $NH_3$ slip past the primary SCR 70 is less than a threshold level. The $NH_3$ slip past the primary SCR 70 may be determined via a $NH_3$ sensor located downstream of the primary SCR 70, $NH_3$ sensor 136 of FIGS. 1 and 2 for example. In other examples, it may be judged if a threshold amount of $NH_3$ has been collected and stored at the secondary SCR 72. If substantially all or a threshold amount of $NH_3$ slippage from the primary SCR 70 has been collected and stored at the secondary SCR 72, method 500 proceeds to 514. Otherwise, method 500 returns to 508.

At 514, method 500 proceeds to consume $NH_3$ stored within the secondary SCR 72. In one example, $NH_3$ stored in the secondary SCR 72 reduces NOx in engine exhaust and supplies $NH_3$ to a primary SCR 70 via desorption. For example, the system of FIG. 1 is operated according to the sequence of FIG. 3 such that a position of an exhaust valve (e.g., 88) is adjusted responsive to NOx slip past the primary SCR 70 and exhaust pressure upstream of the primary SCR 70. In particular, the position of the exhaust valve is adjusted to increase pressure at the outlet of the primary SCR 70 so that exhaust flows through the secondary SCR 72 when pressure upstream of the primary SCR 70 falls due to valve timing and cylinder pressure of cylinders supplying exhaust gas to the primary SCR 70. In one example, the position of exhaust valve 88 is adjusted to increase exhaust pressure downstream of the SCR when exhaust pressure upstream of the SCR is being reduced. Thus, the pressure downstream of the SCR is controlled to be out of phase with exhaust pressure upstream of the SCR to drive exhaust flow through the secondary SCR 72.

In another example, exhaust valves of the system of FIG. 2 are adjusted to direct substantially all engine exhaust gas to the secondary SCR 72 without sending engine exhaust gas directly to the primary SCR 70. Exhaust gases flowing to the secondary SCR 72 are then directed to the primary SCR 70 along with $NH_3$ desorbed from the secondary SCR 72. The $NH_3$ desorbed from the secondary SCR 72 reduces NOx flowing through the primary SCR 70. Further, additional $NH_3$ may be injected upstream of the primary SCR 70 when exhaust gas is directed from the engine to the secondary SCR 72 and then to the primary SCR 70. In this way, $NH_3$ desorbed from the secondary SCR 72 and injected $NH_3$ may participate in the reduction of NOx within the primary SCR 70. In one example, the amount of $NH_3$ injected to the primary SCR 70 may be decreased according to the amount of $NH_3$ estimated to be stored within the secondary SCR 72. For example, if 0.2 grams of $NH_3$ is stored within the secondary SCR 72 the amount of $NH_3$ injected may be reduced by a percentage of the amount of $NH_3$ stored within the secondary SCR 72 (e.g. 0.1 grams or 50% of the amount of $NH_3$ stored).

The $NH_3$ stored within the secondary SCR 72 may be consumed via reduction of NOx passing through the secondary SCR 72 or via desorption of $NH_3$ from the secondary SCR 72 and conversion of NOx in the primary SCR 70 using desorbed $NH_3$. Method 500 proceeds to 516 as $NH_3$ is consumed from the secondary SCR 72.

At 516, method 500 judges whether or not $NH_3$ stored within the secondary SCR 72 is depleted to less than a threshold level. In one example, a judgment of a level of $NH_3$ stored within the secondary SCR 72 may be based on an amount of NOx flowing out of the secondary SCR 72. If the amount of NOx flowing out of the secondary SCR 72 increases, it may be judged that $NH_3$ stored in the secondary SCR 72 is less than a threshold level. For example, if NOx sensor 250 of FIG. 2 indicates increasing NOx flowing out of secondary SCR 72 when NOx flowing into secondary SCR 72 is not increasing, it may be judged that an amount of $NH_3$ stored in the secondary SCR 72 is less than a threshold level. If the amount of NH3 stored in the secondary SCR 72 is less than a threshold level, method 500 proceeds to 518. Otherwise, method 500 returns to 514 where consumption of $NH_3$ stored within the secondary SCR 72 continues.

At 518, method 500 inhibits exhaust flow to the secondary SCR 72. In one example, the system of FIG. 1 stops exhaust flowing to secondary SCR 72 via closing exhaust valves 80 and 84. In another example, the system of FIG. 2 stops exhaust flowing to the secondary SCR 72 via adjusting the operating states of exhaust valves 202, 206, 208, and 204 so that engine exhaust gases flow from engine 10 to primary SCR 70 without flowing to secondary SCR 72. Exhaust gases exit primary SCR 70 and are directed to atmosphere without being directed to secondary SCR 72. Method 500 proceeds to exit after the secondary SCR 72 is closed off from engine exhaust flow.

In this way, $NH_3$ slip may be detected at the outlet of a primary SCR 70 when exhaust is not flowing through a secondary SCR 72. The $NH_3$ may be routed to the secondary SCR 72 for storage. After $NH_3$ slip is no longer detected from the primary SCR 70, exhaust may be routed from the secondary SCR 72 to the primary SCR 70 so that $NH_3$ stored in the secondary SCR 72 may be consumed in the primary SCR 70 via reduction of exhaust gas NOx.

Thus, the method of FIG. 5 provides for controlling SCR $NH_3$ slippage, comprising: routing $NH_3$ from a first SCR to a second SCR; storing the $NH_3$ within a second SCR; and flowing exhaust gases from the second SCR to the first SCR. The method also includes where flow through the second SCR is in a first direction when the $NH_3$ is being stored within the second SCR and where flow through the second SCR is in a second direction when the $NH_3$ is being consumed via NOx reduction. The method includes where $NH_3$ is routed from the first SCR to the second SCR in response to a sensed level of $NH_3$ exceeding a threshold. In one example, the method includes where the $NH_3$ is injected only to the first SCR. The method also includes where the flow of exhaust gases from the second SCR to the first SCR is adjusted according to a pressure in an exhaust system. The method also includes where exhaust gases flow from the second SCR to the first SCR in response to a temperature of the first SCR, and where at least a portion of $NH_3$ stored at the second SCR is consumed at the SCR via reducing NOx.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A system for controlling vehicle exhaust system NH3 slippage, comprising:
a first SCR positioned in a vehicle exhaust system downstream of an engine;
a second SCR positioned in the vehicle exhaust system;
a first valve and a second valve; and
a controller including instructions to direct NH3 slippage from an outlet of the first SCR to an inlet of the second SCR, and to direct exhaust gases from an outlet of the second SCR to an inlet of the first SCR, the controller including further instructions to adjust a state of the first valve to direct NH3 slippage from the first SCR to the second SCR and to adjust a state of the second valve to direct exhaust gases from the second SCR to the first SCR and from the first SCR directly to atmosphere.

2. The system of claim 1, where the controller includes further instructions for flowing exhaust through the second SCR in two directions, the two directions comprising flowing exhaust from the inlet of the second SCR, through the second SCR, and then to the outlet of the second SCR, and flowing exhaust from the outlet of the second SCR, through the second SCR, and then to the inlet of the second SCR.

3. The system of claim 2, where the controller includes further instructions for flowing exhaust through the first SCR in only a single direction.

4. The system of claim 1, further comprising a butterfly valve positioned downstream of the first SCR in a direction of exhaust flow.

5. The system of claim 1, where the controller includes further instructions for directing exhaust gases from the second SCR to the first SCR after a temperature of the first SCR exceeds a threshold temperature.

6. A NH3 slippage control system, comprising:
a first SCR positioned in an exhaust system downstream of an engine;
a second SCR positioned in the exhaust system in parallel with the first SCR, an outlet of the second SCR being coupled to an inlet of the first SCR and an outlet of the first SCR being coupled to an inlet of the second SCR; and
a controller including instructions to direct first SCR NH3 slippage to the second SCR, and instructions to reduce an amount of NH3 stored within the second SCR after first SCR NH3 slippage is less than a threshold level.

7. The NH3 slippage control system of claim 6, further comprising a first valve that directs SCR NH3 slippage from the first SCR to the second SCR, where the first valve is positioned in a first exhaust path, and where the first valve is positioned downstream of the first SCR in a direction of exhaust flow from the first SCR.

8. The NH3 slippage control system of claim 7, further comprising a second valve that directs exhaust from the second SCR to the first SCR, where the second valve is positioned in a second exhaust path, the second exhaust path in parallel with the first exhaust path.

9. The NH3 slippage control system of claim 6, further comprising a NH3 injector positioned upstream of the first SCR in the exhaust system and downstream of the engine.

10. The NH3 slippage control system of claim 6, further comprising additional controller instructions for adjusting flow through the second SCR in response to a pressure in the exhaust system.

11. The NH3 slippage control system of claim 6, further comprising four exhaust valves and additional controller instructions for adjusting states of the four exhaust valves to reverse flow through the second SCR.

12. The NH3 slippage control system of claim 11, further comprising additional controller instructions for maintaining flow in a single direction through the first SCR.

* * * * *